United States Patent
Sato et al.

(10) Patent No.: US 8,673,799 B2
(45) Date of Patent: *Mar. 18, 2014

(54) DIELECTRIC CERAMIC COMPOSITION AND CERAMIC ELECTRONIC DEVICE

(75) Inventors: Jun Sato, Tokyo (JP); Fumiaki Satoh, Tokyo (JP); Saori Takeda, Tokyo (JP); Masakazu Hosono, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,082

(22) Filed: Mar. 26, 2012

(65) Prior Publication Data

US 2012/0252657 A1    Oct. 4, 2012

(30) Foreign Application Priority Data

Mar. 29, 2011   (JP) ................... 2011-073336

(51) Int. Cl.
*C04B 35/468* (2006.01)
*H01G 4/12* (2006.01)

(52) U.S. Cl.
USPC .............. 501/139; 501/138; 361/321.4

(58) Field of Classification Search
USPC .................. 501/138, 139; 361/321.4
See application file for complete search history.

(56) References Cited

U.S. PATENT DOCUMENTS

| | | | |
|---|---|---|---|
| 5,995,360 A | 11/1999 | Hata et al. | |
| 6,226,172 B1 | 5/2001 | Sato et al. | |
| 7,618,910 B2 * | 11/2009 | Yanagida et al. | 501/139 |
| 8,208,240 B2 * | 6/2012 | Yamazaki et al. | 361/321.4 |
| 8,335,073 B2 * | 12/2012 | Komatsu et al. | 361/321.5 |
| 8,363,383 B2 * | 1/2013 | Sato et al. | 361/321.2 |
| 2007/0225154 A1 * | 9/2007 | Yanagida et al. | 501/139 |
| 2009/0086407 A1 * | 4/2009 | Takahashi et al. | 361/321.5 |
| 2010/0188797 A1 * | 7/2010 | Yamazaki et al. | 361/303 |
| 2011/0216473 A1 * | 9/2011 | Takano et al. | 361/321.5 |
| 2011/0222206 A1 | 9/2011 | Komatsu et al. | |
| 2011/0286146 A1 | 11/2011 | Sato et al. | |
| 2012/0063056 A1 * | 3/2012 | Takano et al. | 361/321.5 |

FOREIGN PATENT DOCUMENTS

| | | |
|---|---|---|
| JP | A-10-223471 | 8/1998 |
| JP | A-2000-154057 | 6/2000 |
| JP | A-2008-135638 | 6/2008 |
| JP | A-2011-190122 | 9/2011 |
| JP | A-2011-241129 | 12/2011 |

* cited by examiner

*Primary Examiner* — Karl Group

(74) *Attorney, Agent, or Firm* — Oliff PLC

(57) ABSTRACT

A dielectric ceramic composition comprises barium titanate as a main component, and as subcomponents, 1.00 to 2.50 moles of an oxide of Mg, 0.01 to 0.20 mole of an oxide of Mn and/or Cr, 0.03 to 0.15 mole of an oxide of at least one element selected from a group consisting of V, Mo and W, 0.20 to 1.50 mole of an oxide of R1 where R1 is at least one selected from a group consisting of Y and Ho, 0.20 to 1.50 mole of an oxide of R2 where R2 is at least one selected from a group consisting of Eu, Gd and Tb and 0.30 to 1.50 mole of an oxide of Si and/or B, in terms of each oxide with respect to 100 moles of the barium titanate.

15 Claims, 1 Drawing Sheet

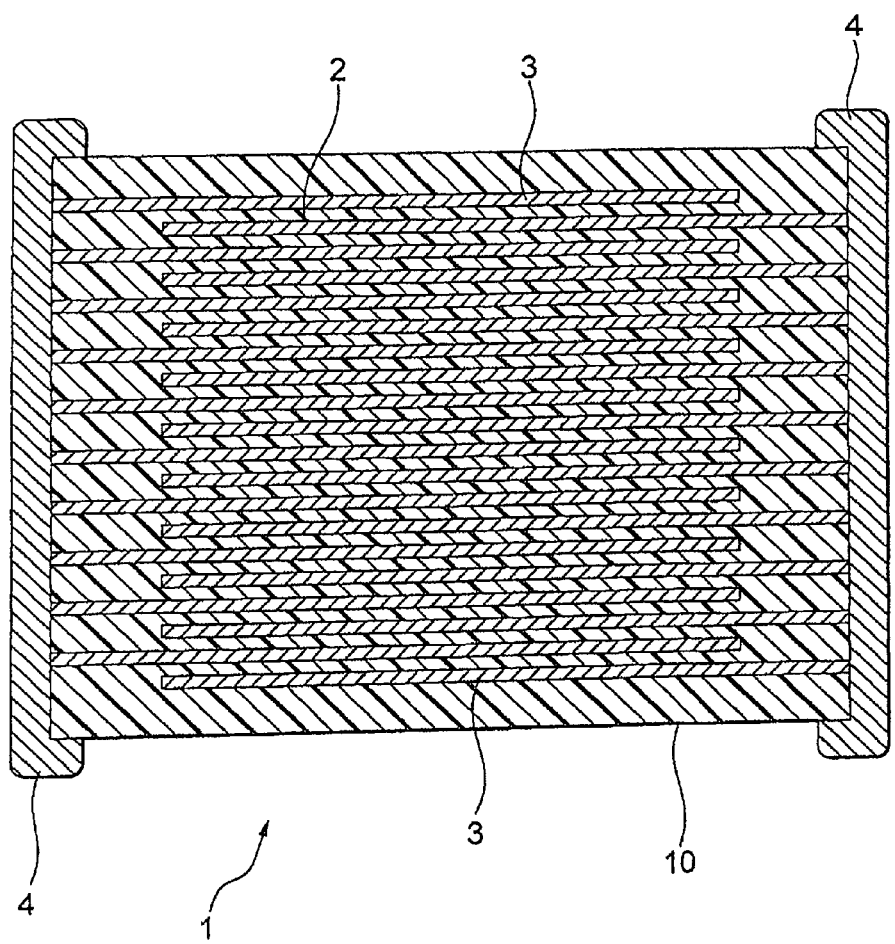

DIELECTRIC CERAMIC COMPOSITION AND CERAMIC ELECTRONIC DEVICE

BACKGROUND OF THE INVENTION

1. Field of the Invention

The present invention relates to a dielectric ceramic composition and a ceramic electronic device, and particularly relates to a dielectric ceramic composition and a ceramic electronic device showing good properties even when a dielectric layer is made thin.

2. Description of the Related Art

A multilayer ceramic capacitor as an example of ceramic electronic devices is widely used as a small-size electronic device showing high performance and being highly reliable, and many of them have been used in electrical equipment and electronic equipment. Recently, as equipment is down-sized and has higher performance, a multilayer ceramic capacitor is further demanded to downsize, improve performance, and enhance reliability.

In response to the demands, it has been promoted to make a dielectric layer of a multilayer ceramic capacitor thinner and to increase the number of layers. However, when a particle diameter of a dielectric particle is reduced in order to make the dielectric layer thinner, specific permittivity is lowered, which results in a problem of failing to obtain the desired properties.

Note that Japanese Unexamined Patent Publication No. 2008-135638 discloses a multilayer ceramic capacitor having a dielectric layer composed of a barium titanate crystal particle and a barium calcium titanate crystal particle wherein 2 kinds of rare-earth elements and other component are included with respect to the barium titanate crystal particle and barium calcium titanate crystal particle. It also discloses that the multilayer ceramic capacitor has high insulation resistance, and shows small reduction of insulation resistance over time in highly accelerated life test.

However, the thickness of the dielectric layer of the multilayer ceramic capacitor disclosed in Examples of Japanese Unexamined Patent Publication No. 2008-135638 is 2 and it has been found that the above problem cannot be solved when the dielectric layer is further made thinner.

SUMMARY OF THE INVENTION

The present invention has been made in view of this situation, and has a purpose to provide a dielectric ceramic composition and a ceramic electronic device showing good properties even when a dielectric layer is made thin.

For attaining the above purpose, a dielectric ceramic composition according to the present invention comprises barium titanate as a main component, and as subcomponents, 1.00 to 2.50 moles of an oxide of Mg, 0.01 to 0.20 mole of an oxide of Mn and/or Cr, 0.03 to 0.15 mole of an oxide of at least one element selected from a group consisting of V, Mo and W, 0.20 to 1.50 mole of an oxide of R1 (R1 is at least one selected from a group consisting of Y and Ho), 0.20 to 1.50 mole of an oxide of R2 (R2 is at least one selected from a group consisting of Eu, Gd and Tb) and 0.30 to 1.50 mole of an oxide of Si and for B, in terms of each oxide with respect to 100 moles of the barium titanate, wherein $\alpha$ and $\beta$ satisfy a relation of $0.25 \leq \beta/(\alpha+\beta) \leq 0.85$ when $\alpha$ and $\beta$ are respectively defined in mole as a content of the oxide of R1 in terms of $R1_2O_3$ and a content of the oxide of R2 in terms of $R2_2O_3$; and a content of A (A is at least one selected from Ba and Ca), a content of B (B is at least one selected from Ti and Zr) satisfy a relation of $1.000 \leq A/B \leq 1.006$ in the dielectric ceramic composition.

In the present invention, by making the contents of the main component and the subcomponent within the above ranges, it is possible to control the state of solid solution of metallic elements of each subcomponent (particularly R1 and R2) into barium titanate as the main component. As a result, it is possible to obtain a dielectric ceramic composition good in various properties (e.g. specific permittivity, dielectric loss, CR product, capacitance-temperature characteristic and highly accelerated life time) even when the dielectric layer is made thin.

R2 is preferably Gd or Tb, further preferably Tb. By using these elements as R2, the above mentioned effects can further be enhanced.

Also, a ceramic electronic device according to the present invention has a dielectric layer constituted by any one of the above dielectric ceramic compositions, and an electrode. Preferably, a thickness of the dielectric layer is 1.0 μm or less. Preferably, an average particle diameter of a dielectric particle of the dielectric layer is 0.1 to 0.3 μm. The ceramic electronic device is not particularly limited, and there may be mentioned a multilayer ceramic capacitor, piezo element, chip inductor, chip varistor, chip thermistor, chip resistor and other surface mount chip-type electronic devices (SMD).

BRIEF DESCRIPTION OF THE DRAWINGS

The FIGURE is a cross-sectional view of a multilayer ceramic capacitor according to an embodiment of the present invention.

DETAILED DESCRIPTION OF THE INVENTION

Hereinafter, the present invention will be explained based on the embodiment shown in the drawing.

Multilayer Ceramic Capacitor 1

As shown in the FIGURE, a multilayer ceramic capacitor 1 as an example of multilayer ceramic electronic devices has a capacitor device body 10 in which dielectric layers 2 and internal electrode layers 3 are alternately stacked. The internal electrode layers 3 are stacked such that each end is alternately exposed to a surface of two facing ends of the capacitor device body 10. A pair of external electrodes 4 is formed on both ends of the capacitor device body 10, which conduct to exposed ends of the internal electrode layers 3 alternately arranged inside the device body 10 respectively to form a capacitor circuit.

The shape of the capacitor device body 10 is not particularly limited and normally a rectangular parallelepiped as shown in the FIGURE. Also, the size is not particularly limited, and may properly be determined depending on the intended use.

Dielectric Layer 2

The dielectric layer 2 is composed of a dielectric ceramic composition according to the present embodiment. The dielectric ceramic composition according to the present embodiment has barium titanate as a main component and includes subcomponents mentioned below.

In the present embodiment, a compound expressed by a composition formula of $Ba_uTi_vO_3$ may be exemplified as barium titanate, for example. Also, in the present invention, barium titanate may be a compound expressed by a formula of $\{(Ba_{(1-x)}Ca_x)O\}_u(Ti_{(1-y)}Zr_y)_vO_2$ in which a part of Ba is substituted by Ca and a part of Ti is substituted by Zr. Note that x, y, u and v are all within any ranges, and are preferably within the following ranges.

In the above formula, a relation of u and v is preferably $0.994 \leq u/v \leq 1.006$. Also, x represents the number of Ca atoms in the above formula, and x is preferably 0≤x≤0.01, more preferably 0≤x≤0.005. In the present invention, Ca may not necessarily be included. Also, y represents the number of Zr atoms, and y is preferably 0≤y≤0.01, more preferably 0≤y≤0.002. In the present invention, Zr may not necessarily be included.

Also, a ratio of lattice constants of c-axis and a-axis, i.e. c/a, in a perovskite-type crystal structure is preferably 1.007 or more. As a result, reduction of specific permittivity is small even when the crystal particle diameter of the dielectric particle is decreased.

Note that it is not necessary that c/a of all dielectric particles satisfy the above range. Namely, for example, raw powders in barium titanate may contain both of particles having low c/a (cubic system) and particles having high c/a (tetragonal system), and raw powders as a whole may be more tetragonal and have c/a within the above range.

The dielectric ceramic composition according to the present embodiment includes a component composed of an oxide of R1 (R1 is at least one selected from Y and Ho), an oxide of R2 (R2 is at least one selected from Eu, Gd and Tb), an oxide of Mg, an oxide of V and an oxide of Si and/or B as a subcomponent in addition to the above main component.

When a content of the oxide of R1 is defined as α, α is preferably 0.2 to 1.5 moles, more preferably 0.2 to 1.0 mole, in terms of $R1_2O_3$ with respect to 100 moles of barium titanate. When α is too large, specific permittivity tends to be lowered. In contrast, too small α may cause to deteriorate temperature characteristics and firing stability. R1 is at least one selected from Y and Ho, and particularly Y is preferable compared to Ho in view of cost and lifetime.

When a content of the oxide of R2 is defined as β, β is preferably 0.2 to 1.5 moles, more preferably 0.5 to 1.2 moles, in terms of $R2_2O_3$ (in case of Tb and the like, $Tb_2O_{3.5}$) with respect to 100 moles of barium titanate. When β is too large, capacity change rate to temperature tends to be increased. In contrast, when β is too small, it tends to be difficult to secure reliability. R2 is at least one selected from Eu, Gd and Tb. Among these, Gd and Tb are preferable compared to Eu in view of excellent reliability, and particularly, Tb is preferable compared to Eu and Tb in view of capacity change rate to temperature.

Also, α and β preferably satisfy a relation of $0.25 \leq \beta/(\alpha+\beta) \leq 0.85$, more preferably, $0.5 \leq \beta/(\alpha+\beta) \leq 0.85$. When $\beta(\alpha+\beta)$ is too large, capacity change rate to temperature tends to be increased, and when too small, lifetime tends to be reduced.

In the present embodiment, the dielectric ceramic composition constituting the dielectric layer has a dielectric particle and a grain boundary, and in the dielectric particle comprising barium titanate as a main component, metallic elements of its subcomponents, e.g. R1 and R2, are dissolved to form a solid solution.

When the dielectric particle includes R2, it is possible to well maintain specific permittivity and to improve reliability, but capacitance-temperature characteristics tend to be deteriorated. Also, when R2 is used alone, it may be difficult to control not only capacitance-temperature characteristics but also sintered density and particle diameter. Therefore, by including R1 in the dielectric particle to keep appropriate particle diameter, it is possible to maintain reliability and to improve capacity temperature characteristics. Such an effect is particularly remarkable when α and β satisfy the above relation.

Also, by controlling the state of solid solution of R1 and R2, reduction of specific permittivity can be inhibited even when crystal particle diameter of the dielectric particle is decreased.

A content of the oxide of Mg is preferably 1.0 to 2.5 moles, more preferably 1.75 to 2.5 moles, in terms of MgO with respect to 100 moles of barium titanate. When the content of the above oxide is too large, reliability tends to be deteriorated. In contrast, too small content may cause to make the control of particle diameter difficult.

A content of the oxide of Mn and/or Cr is preferably 0.01 to 0.2 mole, more preferably 0.03 to 0.1 mole, in terms of MnO or $Cr_2O_3$ with respect to 100 moles of barium titanate oxide. When the content of the above oxide is too large, electrostatic capacitance tends to be reduced. In contrast, when it is too small, resistance to reduction may not sufficiently be obtained and reliability tends to be deteriorated. In the present embodiment, the oxide of Mn is preferable.

A content of the oxide of at least one element selected from a group consisting of V, Mo and W is preferably 0.03 to 0.15 mole, more preferably 0.05 to 0.12 mole, in terms of $V_2O_5$, $MoO_3$ and $WO_3$ with respect to 100 moles of barium titanate. When the content of the above oxide is too large, insulation resistance tends to be deteriorated. In contrast, when it is too small, reliability tends to be deteriorated.

The oxide of Si and/or B mainly has a role as a sintering aid, and is included in preferably 0.3 to 1.5 moles, more preferably 0.5 to 1.0 mole, in terms of oxides, $SiO_2$ and $B_2O_3$. When the content of the above oxide is too large, electrostatic capacitance tends to be lowered. In contrast, when it is too small, reliability tends to be deteriorated. In the present embodiment, the oxide of Si is preferable.

Also the dielectric ceramic composition according to the present embodiment may further include other components depending on the desired characteristics.

Also, in the dielectric ceramic composition (dielectric layer 2) according to the present embodiment, a content of A (A is at least one selected from Ba and Ca) and a content of B (B is at least one selected from Ti and Zr) satisfy a relation of 1.000≤A/B≤1.006. When the above ratio of A/B is too large, electrostatic capacitance tends to be lowered. In contrast, too small content may cause abnormal grain growth which makes firing difficult, dielectric loss and capacity change rate to temperature tend to be increased, and reliability tends to be deteriorated.

In the present embodiment, the ratio of A/B in the finally obtained dielectric ceramic composition (dielectric layer 2) can be adjusted into the predetermined range by the ratio of u/v of barium titanate as the main component, or by adding A (A is at least one selected from Ba and Ca) or B (B is at least one selected from Ti and Zr) as subcomponents.

Note that A (A is at least one selected from Ba and Ca) or B (B is at least one selected from Ti and Zr) may be mixed in as an impurity during the process of production. In the present invention, the ratio of A/B is needed to be within the above range in the finally obtained dielectric ceramic composition (dielectric layer 2) even when component A and/or component B are mixed in as an impurity during the process of production.

It is possible to confirm whether the ratio of A/B in the finally obtained dielectric ceramic composition (dielectric layer 2) falls within the predetermined range by, for example, measuring a sample of the dielectric ceramic composition by glass bead method with X-ray fluorescence instrument and calculating the ratio of A/B.

A crystal particle diameter of the dielectric particle included in the dielectric ceramic composition according to the present embodiment is not particularly limited, and BET specific surface area is preferably 3.3 to 10 $m^2/g$ (the particle diameter by SEM observation is preferably 0.1 to 0.3 µm) in response to the demand of making the dielectric layers thinner.

Thickness of the dielectric layer 2 is not particularly limited, and the present invention is effectively functioned when the thickness is 1.0 µm or less per layer. Conventionally, when the dielectric layer 2 is thin as 1.0 µm or less, reliability is remarkably lowered, but according to the dielectric ceramic composition of the present invention, excellent reliability can be secured. Also, in case that the thickness of the dielectric layer 2 is 1.0 µm or less, a defect in pressure resistance notably occurs when a distance between dielectric layers becomes smaller than 3.5 times as large as the average particle diameter. Consequently, the particle diameter is required to be smaller than 0.3 µm. However, when the particle diameter is smaller than 0.1 µm, permittivity is notably lower, which is not preferable. Therefore, the particle diameter of the dielectric particle is preferably 0.1 to 0.3 µm. Note that the lower limit of the thickness of the dielectric layer 2 is not particularly limited, and is for example 0.4 µm or so.

The number of the stacked dielectric layers 2 is not particularly limited, and is preferably 20 or more, more preferably 50 or more, particularly preferably 100 or more. The upper limit of the number of layers is not particularly limited, and is for example 2000 or so.

Internal Electrode Layer 3

Conducting material included in the internal electrode layer 3 is not particularly limited, and relatively inexpensive base metal can be used because materials for constituting the dielectric layer 2 have resistance to reduction. As the base metal used for the conducting material, Ni or Ni alloy is preferable. As the Ni alloy, an alloy of Ni with one or more elements selected from Mn, Cr, Co and Al is preferable, and Ni content in the alloy is preferably 95 wt % or more. Note that Ni or Ni alloy may include a variety of trace components such as P in about 0.1 wt % or less. Thickness of the internal electrode layer 3 may be properly determined depending on the intended use, and is normally 0.4 to 1.5 µm, particularly preferably 0.5 to 1.0 µm or so.

External Electrode 4

Conducting material included in the external electrode 4 is not particularly limited, and inexpensive Ni, Cu or alloy thereof can be used in the present invention. Thickness of the external electrode 4 may be properly determined depending on the intended use, and normally preferably 5 to 50 µm or so.

Method for Manufacturing Multilayer Ceramic Capacitor 1

The multilayer ceramic capacitor 1 of the present embodiment can be, as with a conventional multilayer ceramic capacitor, manufactured by producing a green chip by normal method using paste such as printing method and sheet method, followed by calcination thereof, and printing or transferring the external electrode followed by calcining the same.

As materials of barium titanate, those produced by various methods such as a variety of liquid phase methods (e.g. oxalate method, hydrothermal synthesis method, alkoxide method, sal-gel method, etc.) in addition to so-called solid-phase method, etc. can be used.

Dielectric materials are prepared by adding the predetermined amount of each oxide directly or after preliminary reaction to the materials of barium titanate, or by directly coating additives onto barium titanate powder. Then, dielectric materials are formed into a paste to obtain a dielectric layer paste. The dielectric layer paste may be organic paste obtained by kneading the dielectric materials and organic vehicle, or may be aqueous paste.

The organic vehicle is obtained by dissolving binder in an organic solvent. The binder used for the organic vehicle is not particularly limited, and may be properly selected from a variety of normal binders such as ethyl cellulose and polyvinyl butyral. The organic solvent is also not particularly limited, and may be properly selected from a variety of organic solvents such as terpineol, butyl carbitol, acetone and toluene depending on the method used such as the printing method and sheet method.

Also, when aqueous paste is used as the dielectric layer paste, aqueous vehicle obtained by dissolving water-soluble binder, dispersant and the like in water may be kneaded with dielectric materials. The water-soluble binder used for the aqueous vehicle is not particularly limited, and for example, polyvinyl alcohol, cellulose, water-soluble acrylic resin and the like may be used.

The internal electrode layer paste may be prepared by kneading conducting materials composed of the above-mentioned a variety of conductive metal or alloy, or a variety of oxides, organic metal compounds, resinates and the like, which become the above-mentioned conducting materials after calcination, with the above-mentioned organic vehicle. Also, the internal electrode layer paste may include co-materials. The common materials are not particularly limited, and preferably have the composition similar to the main component.

The external electrode paste may be prepared as with the above mentioned internal electrode layer paste.

Content of the above-mentioned organic vehicle in each paste is not particularly limited, and may be normal content, for example, 1 to 5 wt % or so for the binder and 10 to 50 wt % or so for the solvent. Also, an additive selected from a variety of dispersants, plasticizers, dielectrics and insulators may be included in each paste if necessary. Total content is preferably 10 wt % or less.

When using the printing method, the dielectric layer paste and the internal electrode layer paste are printed on a substrate such as PET, stacked and cut into a predetermined shape, followed by peeling off the substrate to obtain a green chip.

Also, when using the sheet method, a green sheet is formed by using the dielectric layer paste, and the internal electrode layer paste is printed thereon to form an internal electrode pattern, followed by stacking the same, so that a green chip is obtained.

Before calcination, the green chip is subject to binder removal treatment. For binder removal conditions, a temperature rising rate is preferably 5 to 500° C./hour, a holding temperature is preferably 180 to 900° C., and temperature holding time is preferably 0.5 to 50 hours. Also, an atmosphere in the binder removal treatment is air or reducing atmosphere.

After the binder removal, the green chip is calcined. In the calcination, a temperature rising rate is preferably 200° C./hour to 2000° C./hour. The holding temperature at the calcination is preferably 1300° C. or less, more preferably 1100 to 1250° C., and the holding time is preferably 0.2 to 4 hours. By making the holding temperature in the above range, it is possible to prevent electrode breaking, deterioration of capacity temperature characteristics, and reduction of the dielectric ceramic composition.

The atmosphere at the calcination is preferably reducing atmosphere, and as the atmosphere gas, for example, mixed gas of $N_2$ and $H_2$ can be humidified to use.

Also, oxygen partial pressure at the calcination may properly be determined depending on the kind of the conducting material in the internal electrode layer paste, and when base metal such as Ni and Ni alloy is used as the conducting material, oxygen partial pressure in the atmosphere is preferably $10^{-14}$ to $10^{-10}$ MPa. By making the oxygen partial pressure in the above range, it is possible to prevent abnormal sintering of the conducting material in the internal electrode layer and oxidation of the internal electrode layer. A temperature decreasing rate is preferably 50 to 2000° C./hour or more.

After the calcination in the reducing atmosphere, a capacitor device body is preferably annealed. The annealing treatment is done for reoxidation of the dielectric layer, and thereby IR lifetime (lifetime of insulation resistance) can remarkably be elongated, so that reliability is improved.

Oxygen partial pressure in the annealing atmosphere is preferably $10^{-9}$ to $10^{-5}$ MPa. By controlling the oxygen partial pressure in the above range, the dielectric layer can easily be re-oxidized, and the internal electrode layer can be prevented from oxidation.

The holding temperature at the annealing is preferably 1100° C. or less, more preferably 700 to 1100° C. By controlling the holding temperature within the above range, the dielectric layer can sufficiently be oxidized, resulting in not only improvements of IR and IR lifetime, but also improvement of capacity temperature characteristics. Note that annealing may be composed only of temperature rising process and temperature decreasing process. Namely, temperature holding time may be zero. In this case, the holding temperature becomes synonymous with the highest temperature.

As the other annealing conditions, a temperature holding time is preferably 0 to 20 hours, more preferably 1 to 4 hours, and a temperature decreasing rate is preferably 50 to 500° C./hour, more preferably 100 to 300° C./hour. Also, atmosphere gas at the annealing is, for example, humidified $N_2$ gas and the like can preferably be used.

In the above-mentioned binder removal treatment, the calcination and the oxidation treatment, for example, a wetter and the like may be used for humidifying $N_2$ gas, mixed gas and the like. In this case, water temperature is preferably 5 to 75° C. or so.

The binder removal treatment, the calcination and the annealing may be done continuously or independently.

The capacitor device body obtained as above is subject to, for example, end surface polishing by barrel polishing, sandblast and the like, and the external electrode paste is applied thereon followed by calcination, so that an external electrode 4 is formed. Then, as needed, a covering layer is formed by plating, etc. on the surface of the external electrode 4.

Thus-manufactured multilayer ceramic capacitor of the present embodiment is mounted on a printed substrate and the like by soldering, etc., and is used in a variety of electronic devices and the like.

Thus, the embodiment of the present invention has been explained, but the present invention is not limited to the above-described embodiment and variously modified within the range of the present invention.

For example, in the above embodiment, a multilayer ceramic capacitor is exemplified as a ceramic electronic device according to the present invention, but such a ceramic electronic device is not limited to a multilayer ceramic capacitor and may be any electronic device having the above constitution.

EXAMPLES

Hereinafter, the present invention will be explained based on further detailed examples, but the present invention is not limited to the examples.

Sample 1

First, barium titanate powder ($Ba_uTi_vO_3$, u/v=0.998) was prepared as material powder of the main component. Also, oxides of Y, Tb, Mg, Mn, V, Si, Ba and Ca were respectively prepared as materials of the subcomponents, and amounts of the main component and the subcomponents were weighed to have the values in Table 1.

TABLE 1

| Sample No. | Subcomponent | | | | | | | Final A/B | Electric properties | | | | Reliability |
|---|---|---|---|---|---|---|---|---|---|---|---|---|---|
| | MgO | MnO | $V_2O_5$ | $Y_2O_3$ | $Tb_2O_{3.5}$ | $SiO_2$ | $\beta/(\alpha+\beta)$ | | tanδ | εs | CRP | TC85 | MTTF |
| 1 | 2.00 | 0.05 | 0.10 | 0.31 | 0.94 | 0.75 | 0.75 | 0.998 | 14.8% | 3,846 | 1037 | −35.1% | 0.0 |
| 2 | 2.00 | 0.05 | 0.10 | 0.31 | 0.94 | 0.75 | 0.75 | 1.000 | 3.0% | 2,480 | 1466 | −14.9% | 1.6 |
| 3 | 2.00 | 0.05 | 0.10 | 0.31 | 0.94 | 0.75 | 0.75 | 1.002 | 2.8% | 2,109 | 1166 | −13.8% | 7.6 |
| 4 | 2.00 | 0.05 | 0.10 | 0.31 | 0.94 | 0.75 | 0.75 | 1.003 | 2.6% | 2,093 | 1105 | −13.2% | 10.5 |
| 5 | 2.00 | 0.05 | 0.10 | 0.31 | 0.94 | 0.75 | 0.75 | 1.004 | 2.6% | 2,040 | 1167 | −12.6% | 18.2 |
| 6 | 2.00 | 0.05 | 0.10 | 0.31 | 0.94 | 0.75 | 0.75 | 1.005 | 2.5% | 2,021 | 1276 | −12.1% | 16.2 |
| 7 | 2.00 | 0.05 | 0.10 | 0.31 | 0.94 | 0.75 | 0.75 | 1.006 | 2.6% | 1,847 | 1109 | −13.1% | 4.58 |
| 8 | 2.00 | 0.05 | 0.10 | 0.31 | 0.94 | 0.75 | 0.75 | 1.007 | 1.9% | 1,455 | 1499 | −14.2% | 9.5 |

Then, 100 parts by weight of mixture of barium titanate and subcomponent materials weighed in the predetermined amounts, 10 parts by weight of polyvinyl butyral resin, 5 parts by weight of dioctyl phthalate (DOP) as a plasticizer, and 100 parts by weight of alcohol as a solvent were mixed by ball mill to form a paste, so that a dielectric layer paste was obtained.

Also separately, 44.6 parts by weight of Ni particle, 52 parts by weight of terpineol, 3 parts by weight of ethyl cellulose, and 0.4 part by weight of benzotriazole were kneaded by triple-roller, and formed into a paste to prepare an internal electrode layer paste.

Then, by using the above-prepared dielectric layer paste, a green sheet was formed on a PET film to have the thickness after drying of 1.2 to 1.3 μm. Next, by using the internal electrode layer paste, an electrode layer was printed thereon in a predetermined pattern, followed by peel-off of the sheet from the PET film, so that a green sheet having an electrode layer was prepared. Then, a plurality of the green sheets having an electrode layer was stacked, pressure was applied thereto to bond to obtain a green stacking body, and the green stacking body was cut into a predetermined size, so that a green chip was obtained.

Next, the obtained green chip was subject to binder removal treatment, calcination and annealing under the following conditions to obtain a multilayer ceramic sintered body.

The binder removal treatment conditions included temperature rising rate: 25° C./hour, holding temperature: 260° C., temperature holding time: 8 hours, and atmosphere: in the air.

The calcination conditions included temperature rising rate: 500° C./hour and holding time: 2 hours. The temperature decreasing rate was 500° C./hour. The atmosphere gas was humidified mixed gas of $N_2+H_2$, and oxygen partial pressure was $10^{-12}$ MPa.

The annealing conditions included temperature rising rate: 400° C./hour, holding temperature: 1000° C., temperature holding hour: 2 hours, temperature decreasing rate: 400° C./hour and atmosphere gas: humidified $N_2$ gas (oxygen partial pressure: $10^{-7}$ MPa).

Note that a wetter was used for humidifying the atmosphere gas in the calcination and annealing.

Then, after an end surface of the obtained multilayer ceramic calcined body was polished by sandblast, InGa was applied as an external electrode, and a sample of a multilayer ceramic capacitor shown was obtained. The size of the obtained capacitor sample was 2.0 mm×1.2 mm×0.6 mm, the thickness of the dielectric layer was 0.95 μm, the thickness of the internal electrode layer was 1.0 μm, and the number of the dielectric layers sandwiched by the internal electrode layers was 4.

Samples 2 to 8

Except for changing u/v of barium titanate as the main component materials within the range of 0.998 to 1.007, and changing a ratio of A/B in the dielectric ceramic composition as shown in Table 1, a multilayer ceramic capacitor was produced for Samples 2 to 8 under the conditions same as Sample 1.

(Evaluation)

(Evaluation of A/B of Dielectric Ceramic Composition)

A part of the obtained dielectric layer paste was sampled, and subject to binder removal treatment at 500° C. in the air to obtain a dielectric powder sample for evaluation. The obtained dielectric powder sample was measured by glass bead method using X-ray fluorescence instrument (Simultix 3530 by Rigaku Corporation), and a ratio of A/B of the dielectric ceramic composition was calculated (no unit). The ratio of A/B in the dielectric layer paste was substantially same as the ratio of A/B in the dielectric ceramic composition (dielectric layer 2). The results are shown in Table 1.

Dielectric Loss (tan δ)

The dielectric loss (tan δ) of a capacitor sample was measured at reference temperature of 25° C. with digital LCR meter (E4980A by Agilent Technologies) under conditions of frequency of 1 kHz and level of input signal (measured voltage) of 0.5 Vrms. The lower dielectric loss is more preferable, and in the present examples, 6.0% or less was evaluated as being good. The results are shown in Table 1.

Specific Permittivity ∈

The specific permittivity ∈ (no unit) was calculated based on electrostatic capacitance measured in the capacitor sample at reference temperature of 25° C. with digital LCR meter (E4980A by Agilent Technologies) under conditions of frequency of 1 kHz and level of input signal (measured voltage) of 0.5 Vrms. The higher specific permittivity is more preferable, and in the present examples, 1500 or more was evaluated as being good. The results are shown in Table 1.

CR Product

The insulation resistance IR of the capacitor sample was measured after direct voltage of 6V/μm was applied at 25° C. with insulation resistance meter (R8340A by Advantest Corporation) onto the capacitor sample for 30 seconds. CR product was measured by obtaining a product of the above measured electrostatic capacitance C (unit is μF) and insulation resistance IR (unit is MΩ). In the present examples, 300 or more was evaluated as being good. The results are shown in Table 1. In the table, CR product is expressed by CRP.

Capacitance-Temperature Characteristic (TC)

The change rate ΔC of the capacitor sample was calculated by measuring the electrostatic capacitance at 85° C. and the electrostatic capacitance at room temperature (25° C.). The change rate AC at 85° C. was evaluated whether it was within 115%. The results are shown in Table 1. In the table, the change rate ΔC is expressed by TC85.

Highly Accelerated Life Time (HALT)

The capacitor sample was held in the state that a direct voltage was applied at 200° C. under an electric field of 15V/μm, and highly accelerated life time was evaluated by measuring lifetime. In the present examples, time from the start of applying pressure until insulation resistance was dropped by 1 digit was defined as breakdown time, and mean time to failure (MTTF) obtained by Weibull analysis of the breakdown time was defined as lifetime. Also, in present examples, the above evaluations were done for 20 capacitor samples, and its average value was determined as highly accelerated life time. In the evaluation criteria, 1.0 hour or more was evaluated as being good. The results are shown in Table 1.

As shown in Table 1, it was confirmed that good properties were obtained for all of the dielectric loss (tan δ), specific permittivity ∈, CR product, capacitance-temperature characteristic (TC) and highly accelerated life time (HALT) when the ratio of A/B, each subcomponent and its content, and a rate of β/(α+β) fell in the ranges of the present invention in the finally obtained dielectric ceramic composition (Samples 2 to 7).

On the other hand, it was confirmed that the dielectric loss (tan δ), capacitance-temperature characteristic (TC) and highly accelerated life time (HALT) had tendencies to deteriorate when the ratio of A/B was smaller than the predetermined range in the dielectric ceramic composition (Sample 1). Also, it was confirmed that specific permittivity c tended to deteriorate when the ratio of A/B was larger than the predetermined range in the dielectric ceramic composition (Sample 8).

Samples 20 to 97

Each subcomponent and its content were changed in the dielectric materials as shown in Tables 2 to 9, and a multilayer ceramic capacitor was produced for Samples 20 to 97 under the conditions same as Sample 1, and subject to same evaluations. The results are shown in Tables 2 to 9.

TABLE 2

| Sample No. | Subcomponent | | | | | | | Final A/B | Electric properties | | | | Reliability |
| | MgO | MnO | $V_2O_5$ | $Y_2O_3$ | $Tb_2O_{3.5}$ | $SiO_2$ | β/(α + β) | | tanδ | ∈s | CRP | TC85 | MTTF |
| --- | --- | --- | --- | --- | --- | --- | --- | --- | --- | --- | --- | --- | --- |
| 20 | 2.00 | 0.20 | 0.05 | 0.00 | 1.50 | 0.75 | 1.00 | 1.004 | 7.0% | 3,584 | 1814 | −22.1% | 3.3 |
| 21 | 2.00 | 0.20 | 0.05 | 0.15 | 0.60 | 0.75 | 0.80 | 1.004 | 2.9% | 2,651 | 2574 | −15.9% | 1.3 |
| 22 | 2.00 | 0.20 | 0.05 | 0.20 | 0.80 | 0.75 | 0.80 | 1.004 | 2.4% | 2,121 | 2340 | −11.0% | 1.1 |
| 23 | 2.00 | 0.20 | 0.05 | 0.44 | 1.31 | 0.75 | 0.75 | 1.004 | 2.2% | 1,608 | 1991 | −10.4% | 5.9 |
| 24 | 2.00 | 0.20 | 0.05 | 1.00 | 1.00 | 0.75 | 0.50 | 1.004 | 2.1% | 1,615 | 1125 | −11.8% | 7.3 |
| 25 | 2.00 | 0.20 | 0.05 | 1.50 | 0.50 | 0.75 | 0.25 | 1.004 | 2.0% | 1,508 | 1866 | −7.6% | 2.0 |
| 26 | 2.00 | 0.20 | 0.05 | 1.75 | 0.60 | 0.75 | 0.26 | 1.004 | 1.9% | 1,478 | 1772 | −6.9% | 1.1 |

TABLE 3

| Sample No. | Subcomponent | | | | | | | Final A/B | Electric properties | | | | Reliability |
| --- | --- | --- | --- | --- | --- | --- | --- | --- | --- | --- | --- | --- | --- |
| | MgO | MnO | $V_2O_5$ | $Y_2O_3$ | $Tb_2O_{3.5}$ | $SiO_2$ | $\beta/(\alpha+\beta)$ | | tan$\delta$ | $\epsilon s$ | CRP | TC85 | MTTF |
| 30 | 1.00 | 0.20 | 0.10 | 1.50 | 0.00 | 0.75 | 0.00 | 1.005 | 2.8% | 1,726 | 963 | −9.6% | 0.1 |
| 31 | 1.00 | 0.20 | 0.05 | 0.45 | 0.15 | 0.75 | 0.25 | 1.004 | 4.0% | 3,166 | 916 | −7.7% | 0.9 |
| 32 | 1.00 | 0.20 | 0.05 | 0.60 | 0.20 | 0.75 | 0.25 | 1.004 | 3.7% | 2,987 | 933 | −8.5% | 1.5 |
| 33 | 1.00 | 0.20 | 0.05 | 0.50 | 0.50 | 0.75 | 0.50 | 1.004 | 2.8% | 2,125 | 1130 | −12.1% | 3.7 |
| 34 | 1.50 | 0.20 | 0.05 | 0.75 | 0.75 | 0.75 | 0.50 | 1.005 | 2.1% | 1,707 | 941 | −13.3% | 5.9 |
| 35 | 1.50 | 0.20 | 0.05 | 0.40 | 1.20 | 0.75 | 0.75 | 1.005 | 2.4% | 1,755 | 1825 | −12.8% | 18.6 |
| 36 | 2.00 | 0.20 | 0.05 | 0.50 | 1.50 | 1.00 | 0.75 | 1.006 | 1.8% | 1,543 | 1745 | −12.3% | 26.7 |
| 37 | 2.00 | 0.20 | 0.05 | 0.50 | 1.75 | 1.00 | 0.78 | 1.006 | 1.8% | 1,368 | 1534 | −15.9% | 18.7 |

TABLE 4

| Sample No. | Subcomponent | | | | | | | Final A/B | Electric properties | | | | Reliability |
| --- | --- | --- | --- | --- | --- | --- | --- | --- | --- | --- | --- | --- | --- |
| | MgO | MnO | $V_2O_5$ | R1 | R2 | $SiO_2$ | $\beta/(\alpha+\beta)$ | | tan$\delta$ | $\epsilon s$ | CRP | TC85 | MTTF |
| 40 | 1.50 | 0.20 | 0.05 | Y 0.75 | Tb 0.75 | 0.75 | 0.50 | 1.005 | 2.1% | 1,707 | 941 | −13.3% | 5.9 |
| 41 | 1.50 | 0.20 | 0.05 | Ho 0.75 | Tb 0.75 | 0.75 | 0.50 | 1.005 | 2.3% | 1,759 | 800 | −12.2% | 3.7 |
| 42 | 1.50 | 0.20 | 0.05 | Y 0.75 | Gd 0.75 | 0.75 | 0.50 | 1.005 | 1.9% | 1,687 | 884 | −14.4% | 4.9 |
| 43 | 1.50 | 0.20 | 0.05 | Y 0.75 | Eu 0.75 | 0.75 | 0.50 | 1.005 | 2.1% | 1,616 | 978 | −14.9% | 3.6 |
| 44 | 1.00 | 0.20 | 0.10 | Y 0.75 | Dy 0.75 | 0.75 | 0.50 | 1.005 | 2.6% | 2,160 | 784 | −7.6% | 0.6 |

TABLE 5

| Sample No. | Subcomponent | | | | | | | Final A/B | Electric properties | | | | Reliability |
| --- | --- | --- | --- | --- | --- | --- | --- | --- | --- | --- | --- | --- | --- |
| | MgO | MnO | $V_2O_5$ | $Y_2O_3$ | $Tb_2O_{3.5}$ | $SiO_2$ | $\beta/(\alpha+\beta)$ | | tan$\delta$ | $\epsilon s$ | CRP | TC85 | MTTF |
| 50 | 1.00 | 0.20 | 0.10 | 1.50 | 0.00 | 0.75 | 0.00 | 1.005 | 2.8% | 1,726 | 963 | −9.6% | 0.1 |
| 51 | 1.00 | 0.20 | 0.10 | 1.25 | 0.30 | 0.75 | 0.19 | 1.005 | 2.2% | 1,585 | 874 | −10.5% | 0.7 |
| 52 | 1.00 | 0.20 | 0.05 | 1.13 | 0.38 | 0.75 | 0.25 | 1.005 | 2.6% | 1,879 | 980 | −11.2% | 1.0 |
| 53 | 1.50 | 0.20 | 0.05 | 0.75 | 0.75 | 0.75 | 0.50 | 1.005 | 2.1% | 1,707 | 941 | −13.3% | 5.9 |
| 54 | 2.00 | 0.20 | 0.05 | 0.56 | 0.94 | 0.75 | 0.63 | 1.004 | 2.3% | 1,643 | 1540 | −10.7% | 12.8 |
| 55 | 2.00 | 0.20 | 0.05 | 0.23 | 1.27 | 0.75 | 0.85 | 1.005 | 1.9% | 1,665 | 1826 | −13.7% | 16.7 |
| 56 | 2.00 | 0.20 | 0.05 | 0.21 | 1.48 | 0.75 | 0.88 | 1.005 | 1.8% | 1,567 | 1625 | −16.2% | 15.5 |
| 57 | 2.00 | 0.20 | 0.05 | 0.00 | 1.50 | 0.75 | 1.00 | 1.004 | 7.0% | 3,584 | 1814 | −22.1% | 3.3 |

TABLE 6

| Sample No. | Subcomponent | | | | | | | Final A/B | Electric properties | | | | Reliability |
| --- | --- | --- | --- | --- | --- | --- | --- | --- | --- | --- | --- | --- | --- |
| | MgO | MnO | $V_2O_5$ | $Y_2O_3$ | $Tb_2O_{3.5}$ | $SiO_2$ | $\beta/(\alpha+\beta)$ | | tan$\delta$ | $\epsilon s$ | CRP | TC85 | MTTF |
| 60 | 0.90 | 0.20 | 0.10 | 0.38 | 1.13 | 0.75 | 0.75 | 1.005 | 11.0% | 3,232 | 1227 | −13.9% | 4.5 |
| 61 | 1.00 | 0.20 | 0.05 | 1.13 | 0.38 | 0.75 | 0.25 | 1.005 | 2.6% | 1,859 | 732 | −7.5% | 1.5 |
| 62 | 1.75 | 0.20 | 0.05 | 0.38 | 1.13 | 0.75 | 0.75 | 1.004 | 2.0% | 1,625 | 1016 | −10.2% | 14.5 |
| 63 | 2.50 | 0.20 | 0.05 | 0.38 | 1.13 | 0.75 | 0.75 | 1.004 | 2.0% | 1,646 | 1102 | −11.3% | 3.5 |
| 64 | 2.75 | 0.20 | 0.05 | 0.38 | 1.13 | 0.75 | 0.75 | 1.004 | 2.1% | 1,618 | 956 | −10.8% | 0.8 |

TABLE 7

| Sample No. | Subcomponent | | | | | | | Final A/B | Electric properties | | | | Reliability |
| --- | --- | --- | --- | --- | --- | --- | --- | --- | --- | --- | --- | --- | --- |
| | MgO | MnO | $V_2O_5$ | $Y_2O_3$ | $Tb_2O_{3.5}$ | $SiO_2$ | $\beta/(\alpha+\beta)$ | | tan$\delta$ | $\epsilon s$ | CRP | TC85 | MTTF |
| 70 | 2.00 | 0.25 | 0.10 | 0.56 | 0.94 | 0.75 | 0.63 | 1.004 | 2.0% | 1,425 | 860 | −7.9% | 11.7 |
| 71 | 2.00 | 0.20 | 0.10 | 0.56 | 0.94 | 0.75 | 0.63 | 1.004 | 2.0% | 1,515 | 1171 | −8.9% | 13.7 |
| 72 | 2.00 | 0.10 | 0.10 | 0.56 | 0.94 | 0.75 | 0.63 | 1.004 | 2.2% | 1,831 | 2064 | −9.8% | 26.5 |
| 73 | 2.00 | 0.03 | 0.10 | 0.56 | 0.94 | 0.75 | 0.63 | 1.004 | 2.2% | 1,933 | 1992 | −10.6% | 20.6 |
| 74 | 2.00 | 0.01 | 0.10 | 0.56 | 0.94 | 0.75 | 0.63 | 1.004 | 2.1% | 1,892 | 2115 | −10.2% | 14.8 |

TABLE 7-continued

| Sample No. | Subcomponent | | | | | | | Electric properties | | | | Reliability |
| --- | --- | --- | --- | --- | --- | --- | --- | --- | --- | --- | --- | --- |
| | MgO | MnO | $V_2O_5$ | $Y_2O_3$ | $Tb_2O_{3.5}$ | $SiO_2$ | $\beta/(\alpha+\beta)$ | Final A/B | tanδ | εs | CRP | TC85 | MTTF |
| 75 | 2.00 | 0.00 | 0.10 | 0.56 | 0.94 | 0.75 | 0.63 | 1.004 | 2.4% | 2,125 | 2352 | −11.1% | 0.1 |
| 76 | 2.00 | Cr 0.10 | 0.10 | 0.56 | 0.94 | 0.75 | 0.63 | 1.004 | 2.1% | 1,816 | 1785 | −9.7% | 21.5 |

TABLE 8

| Sample No. | Subcomponent | | | | | | | Electric properties | | | | Reliability |
| --- | --- | --- | --- | --- | --- | --- | --- | --- | --- | --- | --- | --- |
| | MgO | MnO | $V_2O_5$ | $Y_2O_3$ | $Tb_2O_{3.5}$ | $SiO_2$ | $\beta/(\alpha+\beta)$ | Final A/B | tanδ | εs | CRP | TC85 | MTTF |
| 80 | 2.00 | 0.20 | 0.01 | 0.56 | 0.94 | 0.75 | 0.63 | 1.004 | 2.0% | 1,712 | 1327 | −11.3% | 0.9 |
| 81 | 2.00 | 0.20 | 0.03 | 0.56 | 0.94 | 0.75 | 0.63 | 1.004 | 2.1% | 1,509 | 3248 | −8.0% | 3.0 |
| 82 | 2.00 | 0.20 | 0.05 | 0.56 | 0.94 | 0.75 | 0.63 | 1.004 | 2.1% | 1,602 | 1925 | −9.8% | 9.6 |
| 83 | 2.00 | 0.20 | 0.10 | 0.56 | 0.94 | 0.75 | 0.63 | 1.004 | 2.0% | 1,515 | 1171 | −8.9% | 13.7 |
| 84 | 2.00 | 0.20 | 0.12 | 0.56 | 0.94 | 0.75 | 0.63 | 1.004 | 2.0% | 1,583 | 636 | −7.6% | 16.2 |
| 85 | 2.00 | 0.20 | 0.15 | 0.56 | 0.94 | 0.75 | 0.63 | 1.004 | 2.0% | 1,640 | 428 | −8.5% | 18.5 |
| 86 | 2.00 | 0.20 | 0.20 | 0.56 | 0.94 | 0.75 | 0.63 | 1.004 | 2.0% | 1,528 | 186 | −8.8% | 23.5 |
| 87 | 2.00 | 0.20 | Mo 0.10 | 0.56 | 0.94 | 0.75 | 0.63 | 1.004 | 2.1% | 1,535 | 1203 | −9.2% | 4.7 |
| 88 | 2.00 | 0.20 | W 0.10 | 0.56 | 0.94 | 0.75 | 0.63 | 1.004 | 2.2% | 1,562 | 1258 | −8.9% | 3.8 |

TABLE 9

| Sample No. | Subcomponent | | | | | | | Electric properties | | | | Reliability |
| --- | --- | --- | --- | --- | --- | --- | --- | --- | --- | --- | --- | --- |
| | MgO | MnO | $V_2O_5$ | $Y_2O_3$ | $Tb_2O_{3.5}$ | $SiO_2$ | $\beta/(\alpha+\beta)$ | Final A/B | tanδ | εs | CRP | TC85 | MTTF |
| 90 | 2.00 | 0.20 | 0.10 | 0.38 | 1.13 | 1.75 | 0.75 | 1.004 | 2.0% | 1,428 | 965 | −5.8% | 1.7 |
| 91 | 2.00 | 0.20 | 0.10 | 0.38 | 1.13 | 1.50 | 0.75 | 1.004 | 2.0% | 1,508 | 1000 | −6.4% | 2.2 |
| 92 | 2.00 | 0.20 | 0.10 | 0.38 | 1.13 | 1.00 | 0.75 | 1.000 | 2.2% | 1,687 | 826 | −7.6% | 5.8 |
| 93 | 2.00 | 0.20 | 0.10 | 0.38 | 1.13 | 0.75 | 0.75 | 1.000 | 2.4% | 1,776 | 811 | −8.8% | 6.2 |
| 94 | 2.00 | 0.20 | 0.10 | 0.38 | 1.13 | 0.50 | 0.75 | 1.000 | 2.4% | 1,825 | 850 | −8.9% | 5.4 |
| 95 | 2.00 | 0.20 | 0.10 | 0.38 | 1.13 | 0.30 | 0.75 | 1.006 | 2.2% | 1,856 | 889 | −8.4% | 3.5 |
| 96 | 2.00 | 0.20 | 0.10 | 0.38 | 1.13 | 0.25 | 0.75 | 1.006 | 2.0% | 1,884 | 936 | −8.8% | 0.8 |
| 97 | 2.00 | 0.20 | 0.10 | 0.38 | 1.13 | B 0.1 + Si 0.5 | 0.75 | 1.006 | 2.4% | 1,854 | 650 | −8.3% | 3.2 |

As shown in Tables 2 to 9, it was confirmed that good properties were obtained for all of the dielectric loss (tan δ), specific permittivity ∈, CR product, capacitance-temperature characteristic (TC) and highly accelerated life time (HALT) when the ratio of A/B, each subcomponent and its content, and a rate off β/(α+β) fell in the ranges of the present invention in the finally obtained dielectric ceramic composition (Samples 22 to 25, 32 to 36, 40 to 43, 52 to 55, 61 to 63, 71 to 74, 76, 81 to 85, 87, 88, 91 to 95 and 97).

On the other hand, as shown in Table 2, it was confirmed that dielectric loss (tan δ) and capacitance-temperature characteristic (TC) had tendencies of deteriorate when the content of the oxide of R1 was smaller than the predetermined range in the dielectric ceramic composition (Samples 20 and 21), and that dielectric loss (tan δ) was further deteriorated particularly without the oxide of R1 (Sample 20), Also, it was confirmed that specific permittivity c tended to deteriorate when the content of the oxide of R1 was larger than the predetermined range in the dielectric ceramic composition (Sample 26).

Also, as shown in Table 3, it was confirmed that highly accelerated life time (HALT) had tendency to deteriorate when the content of the oxide of R2 was smaller than the predetermined range in the dielectric ceramic composition (Samples 30 and 31). Also, it was confirmed that specific permittivity ∈ and capacitance-temperature characteristic (TC) had tendencies to deteriorate when the content of the oxide of R2 was larger than the predetermined range in the dielectric ceramic composition (Sample 37).

Also, as shown in Table 4, it was confirmed that it was not possible to obtain sufficient highly accelerated life time (HALT) when Dy out of the range of the present invention was used as R2 (Sample 44).

Also, it was confirmed that Samples 40 and 42 in which R2 was Tb and Gd were excellent in CR product and highly accelerated life time (HALT) compared to Sample 43 in which Eu was used, and that particularly, it was possible to more improve specific permittivity ∈ and capacitance-temperature characteristic (TC) when R2 was Tb, compared to the cases of Gd and Eu. Note that values of R1 and R2 (RE) in Table 4 are obtained in terms of $RE_2O_3$ (in case of Tb and the like, $Tb_2O_{3.5}$).

Also, as shown in Table 5, it was confirmed that highly accelerated life time (HALT) had tendency to deteriorate when the rate off β/(α+β) was smaller than the predetermined range in the dielectric ceramic composition (Samples 50 and 51). Also, it was confirmed that capacitance-temperature characteristic (TC) had tendency to deteriorate when the rate of β/(α+β) was larger than the predetermined range in the dielectric ceramic composition (Samples 56 and 57).

Also, as shown in Table 6, it was confirmed that dielectric loss (tan δ) had tendency to deteriorate when the content of the oxide of Mg was smaller than the predetermined range in the dielectric ceramic composition (Sample 60). Also, it was confirmed that highly accelerated life time (HALT) had tendency to deteriorate when the content of the oxide of Mg was larger than the predetermined range in the dielectric ceramic composition (Sample 64).

Also, as shown in Table 7, it was confirmed that highly accelerated life time (HALT) had tendency to deteriorate when the content of the oxide of Mn was smaller than the predetermined range in the dielectric ceramic composition (Sample 75). Also, it was confirmed that specific permittivity ∈ had tendency to deteriorate when the content of the oxide of Mn was larger than the predetermined range in the dielectric ceramic composition (Sample 70).

Furthermore, it was confirmed that it was possible to more improve CR product and highly accelerated life time (HALT) when the oxide of Mn was used, compared to the cases using the oxide of Cr. Note that values of Cr in Table 7 are obtained in terms of $Cr_2O_3$.

Also, as shown in Table 8, it was confirmed that highly accelerated life time (HALT) had tendency to deteriorate when the content of the oxide of V was smaller than the predetermined range in the dielectric ceramic composition (Sample 80). Also, it was confirmed that CR product had tendency to deteriorate when the content of the oxide of Mn was larger than the predetermined range in the dielectric ceramic composition (Sample 86).

Furthermore, it was confirmed that it was possible to more improve highly accelerated life time (HALT) when the oxide of V was used, compared to the cases using the oxides of Mo and W. Note that values of Mo and W are obtained in terms of $MoO_3$ and $WO_3$, respectively.

Also, as shown in Table 9, it was confirmed that highly accelerated life time (HALT) had tendency to deteriorate when the content of the oxide of Si was smaller than the predetermined range in the dielectric ceramic composition (Sample 96). Also, it was confirmed that specific permittivity ∈ had tendency to deteriorate when the content of the oxide of Si was larger than the predetermined range in the dielectric ceramic composition (Sample 90).

Samples 100 to 107

In Sample 101, based on the above-mentioned Sample 72, each subcomponent and its content were changed as shown in Table 10, and BaO and CaO were added separately from the main component to have the final A/B of 1.004 as in Sample 72. Except for the above, a multilayer ceramic capacitor was produced and reliability was evaluated as with Sample 72. Furthermore, except for changing the interlayer thickness in Samples 100, 102 and 103 as shown in Table 10, a multilayer ceramic capacitor was produced and reliability was evaluated as with Sample 101. The results are shown in Table 10.

Also, in Samples 104 to 107, each subcomponent and its content were changed as shown in Table 10, the content of $SiO_2$ was increased to 2.5 moles, and the final A/B was as large as 1.019 (Comparative Example). Except for the above, a multilayer ceramic capacitor having different interlayer thickness was produced and reliability was evaluated as with Samples 100 to 103. The results are shown in Table 10.

TABLE 10

| Sample No. | Subcomponent | | | | | | | | | Final A/B | Interlayer μm | Reliability MTTF |
|---|---|---|---|---|---|---|---|---|---|---|---|---|
| | MgO | MnO | $V_2O_5$ | $Y_2O_3$ | $Tb_2O_{3.5}$ | $SiO_2$ | β/(α+β) | BaO | CaO | | | |
| 100 | 2.00 | 0.10 | 0.10 | 0.56 | 0.94 | 0.75 | 0.63 | 0.30 | 0.10 | 1.004 | 0.71 | 4.5 |
| 101 | | | | | | | | | | | 0.95 | 26.5 |
| 102 | | | | | | | | | | | 1.38 | 149 |
| 103 | | | | | | | | | | | 2.09 | 4336 |
| 104 | 1.20 | 0.20 | 0.06 | 0.50 | 1.30 | 2.50 | 0.72 | 1.14 | 0.86 | 1.019 | 0.98 | 0.1 |
| 105 | | | | | | | | | | | 1.42 | 2.8 |
| 106 | | | | | | | | | | | 2.05 | 479 |
| 107 | | | | | | | | | | | 2.85 | 27371 |

As shown in Table 10, it was confirmed that reliability was notably lowered in Sample 104 to 107 as comparative examples when the interlayer thickness was as thin as 1.0 μm or less while reliability was highly secured in Samples 100 to 103 as the present examples even when the interlayer thickness was as thin as 1.0 μm or less.

The invention claimed is:

1. A dielectric ceramic composition comprising barium titanate as a main component, and as subcomponents,
    1.00 to 2.50 moles of an oxide of Mg,
    0.01 to 0.20 mole of an oxide of Mn and/or Cr,
    0.03 to 0.15 mole of an oxide of at least one element selected from a group consisting of V, Mo and W,
    0.20 to 1.50 mole of an oxide of R1 where R1 is at least one selected from a group consisting of Y and Ho,
    0.20 to 1.50 mole of an oxide of R2 where R2 is at least one selected from a group consisting of Eu, Gd and Tb and
    0.30 to 1.50 mole of an oxide of Si and/or B,
    in terms of each oxide with respect to 100 moles of said barium titanate, wherein:
    α and β satisfy a relation of 0.25≤β/(α+β)<0.85 when α and β are respectively defined in mole as a content of the oxide of R1 in terms of $R1_2O_3$ and a content of the oxide of R2 in terms of $R2_2O_3$; and
    a content of A (A is the total of Ba and Ca in the dielectric ceramic composition), a content of B (B is the total of Ti and Zr in the dielectric ceramic composition) satisfy a relation of 1.000≤A/B≤1.006 in the dielectric ceramic composition.

2. The dielectric ceramic composition as set forth in claim 1, wherein said R2 is Gd or Tb.

3. The dielectric ceramic composition as set forth in claim 2, wherein said R2 is Tb.

4. A ceramic electronic device having a dielectric layer, composed of the dielectric ceramic composition as set forth in claim 1, and an electrode.

5. A ceramic electronic device having a dielectric layer, composed of the dielectric ceramic composition as set forth in claim 2, and an electrode.

6. A ceramic electronic device having a dielectric layer, composed of the dielectric ceramic composition as set forth in claim 3, and an electrode.

7. The ceramic electronic device as set forth in claim 4, wherein a thickness of said dielectric layer is 1.0 μm or less.

8. The ceramic electronic device as set forth in claim 5, wherein a thickness of said dielectric layer is 1.0 μm or less.

9. The ceramic electronic device as set forth in claim 6, wherein a thickness of said dielectric layer is 1.0 μm or less.

10. The ceramic electronic device as set forth in claim 4, wherein an average particle diameter of a dielectric particle of said dielectric layer is 0.1 to 0.3 μm.

11. The ceramic electronic device as set forth in claim 5, wherein an average particle diameter of a dielectric particle of said dielectric layer is 0.1 to 0.3 μm.

12. The ceramic electronic device as set forth in claim 6, wherein an average particle diameter of a dielectric particle of said dielectric layer is 0.1 to 0.3 μm.

13. The ceramic electronic device as set forth in claim 7, wherein an average particle diameter of a dielectric particle of said dielectric layer is 0.1 to 0.3 μm.

14. The ceramic electronic device as set forth in claim 8, wherein an average particle diameter of a dielectric particle of said dielectric layer is 0.1 to 0.3 μm.

15. The ceramic electronic device as set forth in claim 9, wherein an average particle diameter of a dielectric particle of said dielectric layer is 0.1 to 0.3 μm.

\* \* \* \* \*